(12) United States Patent
O'Connell et al.

(10) Patent No.: US 10,955,664 B2
(45) Date of Patent: Mar. 23, 2021

(54) TRANSPARENT DISPLAY WITH EYE PROTECTION

(71) Applicant: L3 TECHNOLOGIES, INC., New York, NY (US)

(72) Inventors: Danny J. O'Connell, Sarasota, FL (US); Daniel L. McDavitt, Roswell, GA (US); James S. Parker, Alpharetta, GA (US); Sanjay Tripathi, Cumming, GA (US)

(73) Assignee: L3 TECHNOLOGIES, INC., New York, NY (US)

( * ) Notice: Subject to any disclaimer, the term of this patent is extended or adjusted under 35 U.S.C. 154(b) by 231 days.

(21) Appl. No.: 15/052,154

(22) Filed: Feb. 24, 2016

(65) Prior Publication Data
US 2017/0242244 A1  Aug. 24, 2017

(51) Int. Cl.
| | | |
|---|---|---|
| *G02B 27/01* | (2006.01) | |
| *G02F 1/35* | (2006.01) | |
| *G03B 21/60* | (2014.01) | |
| *F41H 11/00* | (2006.01) | |
| *H04N 9/31* | (2006.01) | |

(Continued)

(52) U.S. Cl.
CPC ......... *G02B 27/0101* (2013.01); *F41H 11/00* (2013.01); *F41H 13/0056* (2013.01); *G02B 5/203* (2013.01); *G02B 5/26* (2013.01); *G02B 5/32* (2013.01); *G02B 27/0103* (2013.01); *G02F 1/3501* (2013.01); *G02F 1/3523* (2013.01); *G03B 21/56* (2013.01); *G03B 21/60* (2013.01); *H04N 9/3161* (2013.01); *G02F 2001/3503* (2013.01); *G02F 2203/52* (2013.01)

(58) Field of Classification Search
CPC .. A61F 9/02; A61F 9/023; G02B 5/20; G02B 5/23; G02B 5/22; G02B 5/26; G02B 5/28; G02B 5/203; G02B 5/204; G02B 5/289; G02B 27/0103; G02B 27/0101
USPC ................................ 359/627, 629–632, 639
See application file for complete search history.

(56) References Cited

U.S. PATENT DOCUMENTS

| | | | |
|---|---|---|---|
| 4,879,167 A | | 11/1989 | Chang |
| 5,018,842 A | * | 5/1991 | Chen ..................... G02F 1/3511 |
| | | | 359/241 |

(Continued)

FOREIGN PATENT DOCUMENTS

| | | |
|---|---|---|
| EP | 2447757 | 5/2012 |

OTHER PUBLICATIONS https://web.archive.org/web/20150226051939/http://www.gentexcorp.com/products/filtron-light-management-technology/filtron-light-management-technology; Feb. 26, 2015.*

(Continued)

*Primary Examiner* — Travis S Fissel
(74) *Attorney, Agent, or Firm* — Dickinson Wright PLLC

(57) ABSTRACT

A transparent display provides eye protection from lasers and other high intensity light sources. The transparent display allows users to view objects clearly through the display while also presenting text, graphics or video on the display surface. Simultaneously, the display assembly comprises a component that provides eye protection against high power radiation sources. The transparent display with eye protection provides both protection from high power light sources and an additional cockpit display surface for presentation of information including graphical images, symbology, video, text, and other data.

16 Claims, 2 Drawing Sheets

(51) Int. Cl.
*G02B 5/20* (2006.01)
*F41H 13/00* (2006.01)
*G02B 5/32* (2006.01)
*G03B 21/56* (2006.01)
*G02B 5/26* (2006.01)

(56) References Cited

U.S. PATENT DOCUMENTS

| | | | | |
|---|---|---|---|---|
| 5,103,323 | A * | 4/1992 | Magarinos | A42B 3/22 351/44 |
| 5,486,821 | A * | 1/1996 | Stevens | G01C 15/14 340/970 |
| 7,202,852 | B2 | 4/2007 | Harvie | |
| 7,344,260 | B2 | 3/2008 | Derenski | |
| 8,582,209 | B1 * | 11/2013 | Amirparviz | G02B 3/0056 359/630 |
| 8,709,305 | B2 | 4/2014 | Sarkar | |
| 2002/0021461 | A1 * | 2/2002 | Ono | G02B 5/0252 359/13 |
| 2005/0162575 | A1 * | 7/2005 | Harvie | A61F 9/022 349/16 |
| 2009/0231687 | A1 * | 9/2009 | Yamamoto | G02B 26/101 359/359 |
| 2010/0020170 | A1 * | 1/2010 | Higgins-Luthman | B60Q 1/1423 348/135 |
| 2011/0075265 | A1 * | 3/2011 | Alekseyev-Popov | A42B 3/226 359/630 |
| 2012/0175571 | A1 | 7/2012 | Sarkar | |
| 2012/0281026 | A1 * | 11/2012 | Atkins | G09G 3/003 345/690 |
| 2015/0338683 | A1 | 11/2015 | Perricone et al. | |
| 2015/0346580 | A1 * | 12/2015 | Williams | G02F 1/3526 359/326 |
| 2016/0033771 | A1 | 2/2016 | Tremblay et al. | |

OTHER PUBLICATIONS

Extended European Search Report, dated Jul. 6, 2017 issued by the European Patent Office on related European patent application 17157997.2.

* cited by examiner

TRANSPARENT DISPLAY WITH EYE PROTECTION

BACKGROUND

Increasing occurrences of laser attacks against aircraft cockpits have created a need for pilot and air crew laser eye protection. Additionally, there is a desire to increase the available display area in cockpits to support applications that improve situational awareness and reduce pilot workload.

Laser illumination of commercial airline or other aircraft cockpits is an operational safety threat. Flight crew exposure to lasers can incapacitate, cause temporary flash blindness or afterimages, and may result in injury to pilots or other air crew members. Reported laser incidents have grown tenfold since 2006.

There have been various approaches proposed for laser eye protection. Examples of such approaches involve cumbersome extendable/retractable devices or devices which must be worn by a user for eye protection. Other approaches include materials and/or filters for providing laser protection. None of the known approaches for providing laser eye protection address the increasing desire to display additional information in the aircraft cockpit.

SUMMARY OF THE INVENTION

Briefly described, the present invention comprises a transparent display that also provides eye protection from lasers and other high intensity light sources. The light source may consist of a single wavelength source (for example, a 632 nm laser, or multiple wavelength sources (for example a 632 nm and a 543 nm laser). The transparent display allows users to view objects clearly through the display while also presenting text, graphics, video, etc. on the display surface. Simultaneously, the display assembly comprises a component that provides eye protection against high power radiation sources. The transparent display with eye protection provides both eye protection from high intensity light sources, such as lasers, and an additional cockpit display surface for presentation of information including graphical images, symbology, video, text, and other data.

In one preferred form, the present invention comprises a transparent laser-protective display system that includes an optical element having a first side facing away from a user and a second side facing a user. The first side is configured to either reflect, deflect, absorb, or attenuate the incident light at undesired wavelengths from high intensity light sources, such as lasers, away from the user. The second side is configured to display images. The second side may consist of a matrix display, like AMLCD/OLED, or a screen for a projected display.

In another preferred form, the present invention includes a transparent laser-protective display system comprising an optical element on a side facing away from a user and a transparent display element on a side facing the user. The optical element is configured to either reflect, deflect, absorb, or attenuate the incident light at undesired wavelengths from high intensity light sources away from the user. The transparent display element is attached to the optical element and is configured to display images to the user. The transparent display element may consist of a matrix display, like AMLCD/OLED, or a screen for a projected display.

BRIEF DESCRIPTION OF THE DRAWING FIGURES

DETAILED DESCRIPTION

The present invention comprises a transparent display that provides eye protection from high intensity coherent light sources, such as lasers, and high intensity non-coherent light sources, such as spotlights. The transparent display allows users to view objects through the display while also presenting text, graphics or video on the display surface. Simultaneously, the display assembly comprises a component providing eye protection against high power radiation sources.

As noted above, there is a growing desire for additional display capability in cockpits. However, currently there is not enough available space in a cockpit. Further, the cost of modifying their existing safety-critical avionics to make room for such additional display is prohibitive. The user of a transparent display, as described herein, creates a unique opportunity to use surfaces, such as aircraft and helicopter window surfaces, as transparent displays while incorporating laser eye protection for the air crew.

The transparent display used in the display systems described herein may utilize different technologies, such as LCD, OLED, AMLCD, or projection displays, including LCOS and scanned laser systems. The display may also comprise Head-Up Display (HUD) or Helmet-Mounted Display (HMD) configurations. The display can be permanently or temporarily positioned in the user's line-of-sight and may be packaged as a stand-alone device, as a film applied to an aircraft window/windscreen, or as an integral part of the window itself.

The display assembly's eye protection components described herein may comprise various active and passive technologies including but not limited to: rejection/notch filters tuned to block specific laser wavelengths, linear or non-linear optical element to limit high emissions (also referred to as a power limiter), neutral filters to reduce the intensity of the unwanted source, as well as narrow band pass filters, long pass filters and polarizers. The eye protection components may reflect, deflect, attenuate, or absorb the high intensity incident light. The eye protection component may be permanently or temporarily incorporated with the display assembly. Further details are provided below with reference to the drawings.

In the description of embodiments that follow, the incident light is referred to as a laser or a high power coherent radiation source which may be reflected by various eye protection components for illustrative purposes. Further, the transparent display components are described as screens and/or matrix elements in various embodiments for illustrative purposes. It should be appreciated, however, that the protective component may be adapted to provide eye protection against any high power incident light by reflecting, deflecting, attenuating, or absorbing the unwanted incident light. Further, the transparent display components may include any suitable display, including LCD, OLED, AMLCD, or projection displays.

Figure 1:
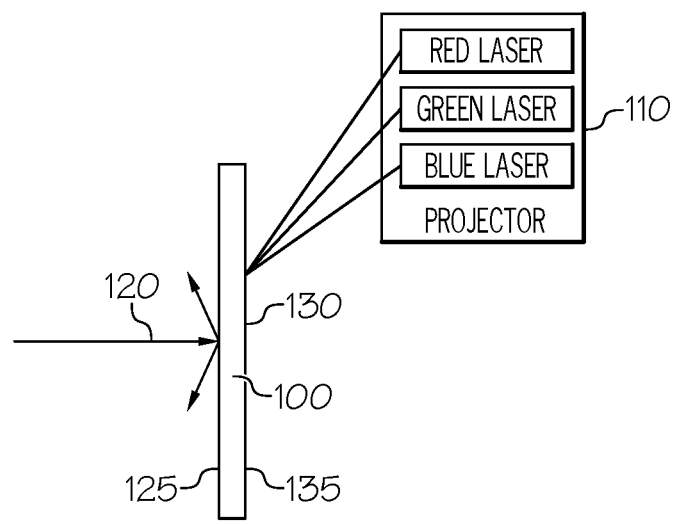
FIG. 1 illustrates a transparent display system with eye protection according to a first illustrative embodiment.

Referring now to the drawings, FIG. 1 illustrates a laser protected transparent display system according to a first embodiment. In this embodiment, a single optical element 100 is tuned to reflect, deflect, attenuate, or absorb common threat light at specific wavelengths, e.g., specific red and green wavelengths. The optical element 100 may also be tuned to reflect blue light at specific wavelengths. The optical element 100 may include non linear optical power limiters, linear optical power limiters, a holographic diffusing element, a notch filter with a projection screen, or may be formed as a grating based optical element.

A display projector 110 is designed to produce low power lasers at the same wavelength to which the optical element 100 is tuned. On the side 125 of the optical element facing away from the user, the optical element 100 reflects the high power incident light 120 at the specific wavelengths to which it is tuned. In this manner, the optical element 100 protects the user from the high power harmful incident light.

The side 135 of the optical element facing the user serves as a projection screen to display images 130 reflected from the projector 110. Since only light at the specific wavelengths to which the optical element are tuned is reflected, the situational awareness of the user's surroundings is maintained.

Figure 2:
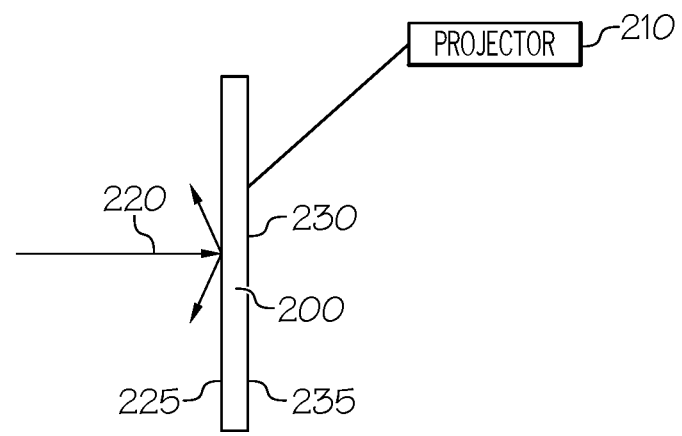
FIG. 2 illustrates a transparent display system with eye protection according to a second illustrative embodiment.

FIG. 2 illustrates another embodiment of a laser protected transparent display system. In this embodiment, one side 235 of an optical element 200, facing the user, is coated with a transparent holographic pattern to reflect light from a projector 210. The projector 210 may project any suitable light, not just light tuned to specific wavelengths. The side 235 of the optical element 200 serves as a projector screen to display images 230 reflected from the projector 210.

The far side 225 of the optical element 200, facing away from the user, includes a passive laser protection coating. This coating may include linear optical power limiters (OPL), e.g., photo chromatic compounds, non linear OPLs, e.g., carbon nanotube based polymeric materials, etc. The coating causes the incident light 220 at undesired wavelengths, e.g., high power coherent light, to be reflected, deflected, attenuated or absorbed, thus protecting the user.

Figure 3:
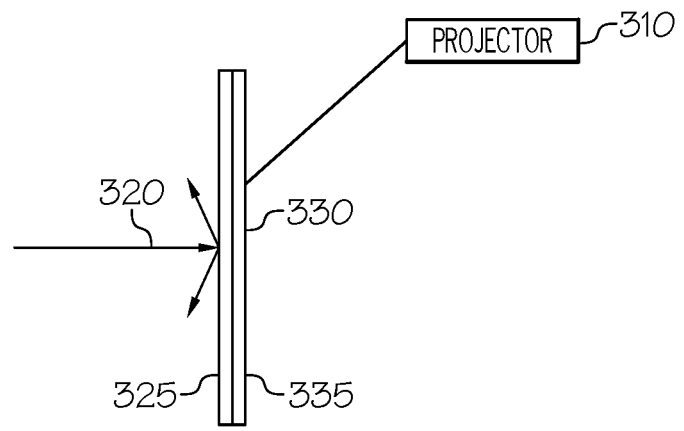
FIG. 3 illustrates a transparent display system with eye protection according to a third illustrative embodiment.
Figure 4:
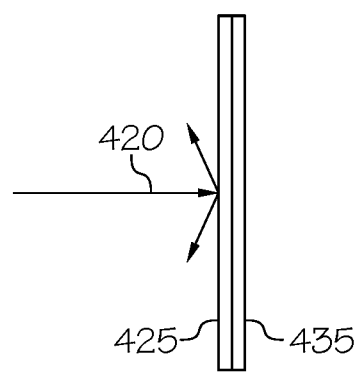
FIG. 4 illustrates a transparent display system with eye protection according to a fourth illustrative embodiment.

FIGS. 3 and 4 show further embodiments of laser protected transparent display systems. In the embodiment shown in FIG. 3, a laser protection element 325 is optically bonded to a display element 335. Similarly, in the embodiment shown in FIG. 4, a laser protection element 425 is optically bonded to a display element 435. The laser protection elements 325 and 425 are bonded on a far side of the display elements 335 and 435, respectively, with respect to the user.

The display element 335 may be a screen tuned to the wavelength(s) of a projector 310. The display element 435 may be an active matrix based transparent display, e.g., a transparent OLED or transparent LCD.

The laser protection elements 325 and/or 425 may include passive laser protection components, such as the passive laser protection coating mentioned above, to reflect undesired high power coherent incident light 320 and/or 420.

As an alternative, the laser protection elements 325 and/or 425 may include active laser protection devices, such as smart structures including a sensor (not shown for simplicity of illustration). The sensor senses the wavelength and/or intensity of incident light 320 and/or 420, and the smart structure responds by absorbing, reflecting, attenuating, and/or deflecting the incident light.

While the claimed invention has been shown and described in example forms, it will be apparent to those skilled in the art that many modifications, additions, and deletions can be made therein without departing from the spirit and scope of the invention as defined by the following claims. For example, while embodiments described above have been directed to display systems used in vehicles such as aircraft, it should be appreciated that the invention may also be useful for laser eye protection in other environments and/or vehicles, e.g., cars, boats, etc.

What is claimed is:

1. A transparent eye-protective display system for a vehicle window, the system comprising:
   an optical element of the vehicle window, the optical element including a first side and a second side, wherein the first side is configured to face outward from a vehicle to reflect, absorb, attenuate, or deflect incident light at one or more undesired wavelengths from one or more high intensity light sources away from the display system, and the second side is configured to face inward into the vehicle to display images, wherein:
   the optical element includes one of a holographic diffusing element and a grating; and
   wherein the first side includes a passive protective coating comprising one of a linear optical power limiter and a non-linear optical power limiter.

2. The transparent eye-protective display system of claim 1, wherein the second side is configured to display an image reflected from a projector.

3. The transparent eye-protective display system of claim 1, wherein the first side faces away from a user to reflect, absorb, attenuate, or deflect the incident light at the undesired wavelengths away from the user, and the second side faces the user to display images to the user.

4. The transparent eye-protective display system of claim 1, wherein the high intensity light sources include lasers and other high power coherent radiation sources.

5. The transparent eye-protective display system of claim 1, wherein the high intensity light sources include high power non-coherent light sources.

6. The transparent eye-protective display system of claim 2, wherein the projector projects red, green and blue lower power laser light at specific wavelengths, towards the second side of the optical element, which is tuned to reflect red, green, and blue light of the specific wavelengths.

7. The transparent eye-protective display system of claim 2, wherein the second side is coated with a transparent holographic pattern to reflect a light from the projector.

8. The transparent eye-protective display system of claim 1, wherein the first side is tuned to reflect a specific wavelength or to reflect, absorb, attenuate, or deflect broad band high intensity light.

9. A transparent eye-protective display system for a vehicle window, the system, comprising:
   an optical element of the vehicle window, the optical element configured to face outward from a vehicle to reflect, absorb, attenuate, or deflect incident light at one or more undesired wavelengths from one or more high intensity light sources away from the display system, wherein the optical element includes one of a holographic diffusing element and a grating;
   a transparent display element attached to the optical element and configured to face inward into the vehicle, wherein the transparent display element is configured to display images; and
   wherein the optical element includes a passive protective coating comprising one of a linear optical power limiter and a non-linear optical power limiter.

10. The transparent eye-protective display system of claim 9, wherein the optical element is disposed on a side of the display system facing away from a user to reflect, absorb, attenuate, or deflect the incident light at the undesired wavelengths away from the user, and the transparent display element is disposed on a side of the display system facing the user to display images to the user.

11. The transparent eye-protective display system of claim 9, wherein the transparent display element includes a screen tuned to a wavelength of a projector that projects light toward the transparent display element, wherein the screen is configured to display images from the projector.

12. The transparent eye-protective display system of claim 9, wherein the display element includes an active matrix based transparent display configured to display images.

13. The transparent eye-protective display system of claim 9, wherein the optical element includes an active protective component.

14. The transparent eye-protective display system of claim 13, wherein the active protective component includes a sensor that senses the undesired wavelength and/or intensity of incoming light and the optical element responds by absorbing, reflecting, attenuating, or deflecting the incoming light.

15. The transparent eye-protection display system of claim 9, wherein the optical element includes a passive protective component.

16. The transparent eye-protective display system of claim 9, wherein the high intensity light sources include at least one of lasers, other high power coherent radiation sources, and high power non-coherent light sources.

\* \* \* \* \*